(12) United States Patent  (10) Patent No.: US 12,297,521 B2
Sakura et al.  (45) Date of Patent: May 13, 2025

(54) METHOD FOR PRODUCING PARTICLES AND PARTICLE PRODUCTION APPARATUS

(71) Applicant: SHOEI CHEMICAL INC., Tokyo (JP)

(72) Inventors: Naoki Sakura, Tosu (JP); Hirokazu Sasaki, Tosu (JP)

(73) Assignee: SHOEI CHEMICAL INC., Tokyo (JP)

(*) Notice: Subject to any disclaimer, the term of this patent is extended or adjusted under 35 U.S.C. 154(b) by 864 days.

(21) Appl. No.: 17/593,898

(22) PCT Filed: Feb. 26, 2020

(86) PCT No.: PCT/JP2020/007752
 § 371 (c)(1),
 (2) Date: Sep. 27, 2021

(87) PCT Pub. No.: WO2020/195486
 PCT Pub. Date: Oct. 1, 2020

(65) Prior Publication Data
 US 2022/0184572 A1 Jun. 16, 2022

(30) Foreign Application Priority Data
 Mar. 28, 2019 (JP) ................. 2019-063379

(51) Int. Cl.
 *B01J 2/00* (2006.01)
 *B01J 19/00* (2006.01)
 (Continued)

(52) U.S. Cl.
 CPC ......... *C22C 1/0433* (2013.01); *B01J 19/0013* (2013.01); *B22F 1/00* (2013.01);
 (Continued)

(58) Field of Classification Search
 CPC .............. B22F 2203/11; B22F 2203/13; B22F 2304/054; B22F 1/00; B22F 9/16;
 (Continued)

(56) References Cited

U.S. PATENT DOCUMENTS 5,759,230 A * 6/1998 Chow ................ B22F 9/24
 75/371
6,458,335 B1 * 10/2002 Lemaitre ............ C07C 51/418
 423/420.2
(Continued)

FOREIGN PATENT DOCUMENTS

JP 2010-510056 A 4/2010
WO 2016194802 A1 12/2016
(Continued)

*Primary Examiner* — Jessee R Roe
*Assistant Examiner* — Michael Aboagye
(74) *Attorney, Agent, or Firm* — Alleman Hall & Tuttle LLP

(57) ABSTRACT

Provided is a method for producing particles, the method including a particle generating step of forming a product particle flow including target product particles by heating a segmented reaction raw material liquid flow divided into segments by a gas for segmentation under applying pressure at a pressure $P_1$ (MPa) and at a heating temperature T (° C.) to react the raw material for particle formation to generate the target product particles, in which, at the particle generating step, $(V_d/V_c)$ is 0.200 to 7.00 and the pressure $P_1$ at the particle generating step is 2.0 times or more a vapor pressure $P_2$ (MPa) of a solvent at the heating temperature T. According to the present invention, a method for producing particles having a narrow particle size distribution with high production efficiency can be provided.

29 Claims, 1 Drawing Sheet

(51) Int. Cl.
  *B22F 1/00* (2022.01)
  *B22F 1/054* (2022.01)
  *B22F 9/16* (2006.01)
  *C22C 1/04* (2023.01)

(52) U.S. Cl.
  CPC ....... *B22F 9/16* (2013.01); *B01J 2219/00141* (2013.01); *B01J 2219/00146* (2013.01); *B01J 2219/00162* (2013.01); *B01J 2219/00186* (2013.01); *B01J 2219/00903* (2013.01); *B22F 2203/11* (2013.01); *B22F 2203/13* (2013.01); *B22F 2302/45* (2013.01); *B22F 2304/054* (2013.01)

(58) Field of Classification Search
  CPC .............. B01J 19/00; B01J 2219/00162; B01J 2219/00186; B01J 19/0013; B01J 2219/00903; C22C 1/0433; C22C 1/0425; C22C 1/0466; B82Y 40/00

USPC .......................... 266/83; 501/80, 84; 75/362
  See application file for complete search history.

(56) References Cited

U.S. PATENT DOCUMENTS

| | | | |
|---|---|---|---|
| 7,833,506 B2 * | 11/2010 | Rauscher | C30B 7/00 |
| | | | 977/773 |
| 10,189,003 B1 * | 1/2019 | Kim | C01B 19/002 |
| 10,640,882 B2 * | 5/2020 | Novet | C01F 17/235 |
| 10,745,822 B2 * | 8/2020 | Novet | C01F 7/02 |
| 2004/0025634 A1 * | 2/2004 | Nakamura | H01F 1/0045 |
| | | | 75/335 |
| 2015/0182936 A1 | 7/2015 | Kim et al. | |

FOREIGN PATENT DOCUMENTS

| | | |
|---|---|---|
| WO | 2017014313 A1 | 1/2017 |
| WO | 2017014314 A1 | 1/2017 |

* cited by examiner

METHOD FOR PRODUCING PARTICLES AND PARTICLE PRODUCTION APPARATUS

TECHNICAL FIELD

The present invention relates to a method for producing particles and a particle production apparatus.

BACKGROUND ART

In order to obtain desired performance, particles may desirably have a narrow particle size distribution. Although various methods exist for producing particles, in such methods, reaction time and reaction temperature are required to be strictly controlled in order to produce the particles having the narrow particle size distribution.

Conventionally, as the method for producing particles, a method in which particles are produced by using a reaction container such as a flask and a tank, and a liquid is heated using a heating device with stirring the liquid in the container has been known. The method is superior in that desired particles can be produced even using small-scale facilities like facilities in a laboratory without requiring large-scale facilities. Increase in the scale of facilities for mass production causes uniform heating for a liquid to be difficult as compared with the case of using smaller scale facilities, and thus a temperature gradient is likely to be generated. As a result, the particle size distribution tends to be wider. In particular, as the desired size of the particles becomes smaller, the particle size distribution is likely to become wider. In addition, quality differences are likely to occur for each batch. In order to reduce these differences, the quality of raw materials and the production conditions such as heating conditions should be strictly controlled, and thus uniform quality products are difficult to stably produce.

On the other hand, a method in which a raw material liquid is reacted by heating from the outer circumference side of a tube using a heating device while the raw material liquid is being continuously flowed in a tubular reaction container to produce particles has also been known. In this method, a distance from the heat source to the farthest liquid is shorter as compared with the case where the reaction container such as a flask is used, and thus the temperature gradient at the time of heating is reduced and the production conditions such as the heating conditions are easily and stably controlled. Consequently, this method is suitable for mass production. Heating from the outer circumference side of the tubular reaction container, however, causes temperature difference between the liquid flowing close to the tube wall and the liquid flowing at the center of the tube. A flow velocity difference between the liquid flowing close to the tube wall and the liquid flowing at the center of the tube is also generated. The particle size distribution of the particles to be generated tends to be wider due to the temperature difference and the velocity difference. In addition, an increase in the diameter of the tube in order to increase the production amount causes particle size distribution to be even wider because the temperature difference and the velocity difference described above further increase.

As a method for solving the above problems, methods in which particles are produced by introducing a gas for segmentation into the raw material liquid to form segmented flow and the raw material liquid is heated have been known (Patent Literatures 1 to 3). In the case where these methods are used, the segmented flow flows in the tube so that the gas extrudes the liquid and thus the problem of generating the flow velocity difference between the liquid flowing close to the tube wall and the liquid flowing at the center of the tube, which occurs in the above method, does not occur. Consequently, the heating time can be uniform because the residential time difference of the solution in the tube is less likely to occur. In addition, the solution is more uniformly heated because the solution is stirred in each segment. Consequently, the particles having a narrow particle size distribution can be produced. In addition, this method allows the production amount to increase as compared with the conventional methods even when the diameter of the tube is increased to some extent because the liquid can be uniformly heated as described above.

CITATION LIST

Patent Literature

Patent Literature 1: WO 2016/194802 Pamphlet
Patent Literature 2: WO 2017/014313 Pamphlet
Patent Literature 3: WO 2017/014314 Pamphlet

SUMMARY

Technical Problem

In order to produce particles with higher production efficiency, however, particles are desirably produced with further higher production efficiency than the production efficiency of the above technique described in Patent Literatures 1 to 3.

The inventors of the present invention have found the followings by performing intensive studies. In the above conventional methods, the flow velocity becomes faster and thus the heating time becomes insufficient due to vaporization of the raw material liquid and expansion of the gas for segmentation even in the case where the reaction is performed under the conditions in which the heating temperature is lower than the boiling point. Therefore, in the conventional method, any of the following methods have to be performed in order to secure the heating time. As one of the methods, a method is used in which the length of the tube is set to long. As the length of the tube becomes longer, however, pressure loss occurring at the tube wall becomes larger. Therefore, a pump that can generate high pressure is needed. Then, unnecessary tubes and a high-pressure pump are needed, which is disadvantageous for safety and from the aspect of cost. For these reasons, a method in which the flow velocity is slowed is exemplified in a method in which the heating time is secured without changing the length of the tube. Slowing the flow velocity, however, results in a decrease in yield. Even in the case where the flow velocity is slow, the yield can be increased by increasing the diameter of the tube. Excessively slow flow rate, however, causes the gas for segmentation to easily float and as the diameter of the tube becomes larger, the gas for segmentation more easily floats in the tube. Therefore, an increase in the yield is difficult to achieve.

Patent Literatures 2 and 3 have suggested that the boiling point of the reaction solvent can be raised by increasing the pressure in the flow path by applying pressure using a restricted flow valve, whereby heating at higher temperatures can be achieved. However, detail is not described.

Therefore, an object of the present invention is to provide a method for producing particles having particle size distribution that is almost equal to or narrower than that of conventional particles with higher production efficiency with safety maintained and without increasing cost, and to provide a production apparatus thereof.

Solution to Problem

The inventors of the present invention have found that the above problems can be solved by satisfying the following two conditions described below at the same time in the method for producing particles using the above segmented flow. Namely, the inventors of the present invention have found that the particles having particle size distribution that is almost equal to or narrower than that of conventional particles can be produced with higher production efficiency with safety maintained and without increasing cost by setting pressure to 2.0 times or more the vapor pressure of the solvent at the heating temperature, and setting a ratio of a reaction raw material liquid to the gas for segmentation in the flow of segmented reaction liquid to a predetermined range. Consequently, the present invention has been attained.

Specifically, the present invention (1) provides a method for producing particles, the method comprising:
- a reaction raw material liquid sending step of sending a reaction raw material liquid including at least a raw material for particle formation and a solvent dissolving the raw material for particle formation;
- a segmented flow forming step of forming a segmented reaction raw material liquid flow in which the reaction raw material liquid is divided into segments by a gas for segmentation by introducing the gas for segmentation into the reaction raw material liquid; and
- a particle generating step of forming a product particle flow including target product particles by heating the segmented reaction raw material liquid flow under applying pressure at a pressure $P_1$ (MPa) and at a heating temperature T (° C.) to react the raw material for particle formation to produce the target product particles, wherein
    at the particle generating step, a ratio ($V_d/V_c$) of a volume $V_d$ (mL) of the gas for segmentation heated at the heating temperature T (° C.) to a volume $V_c$ (mL) of the reaction raw material liquid heated at the heating temperature T (° C.) in the segmented reaction raw material liquid flow is 0.200 to 7.00, and
    the pressure $P_1$ at the particle generating step is 2.0 times or more a vapor pressure $P_2$ (MPa) of the solvent at the heating temperature T.

The present invention (2) provides the method for producing particles according to (1), in which at the segmented flow forming step, the gas for segmentation is introduced into the reaction raw material liquid in a quantity in which a ratio ($V_b/V_a$) of a volume $V_b$ (mL) of the gas for segmentation to a volume $V_a$ (mL) of the reaction raw material liquid is 0.100 to 3.00.

The present invention (3) provides the method for producing particles according to (1) or (2), in which at the particle generating step, the ratio ($V_d/V_c$) of the volume $V_d$ (mL) of the gas for segmentation heated at the heating temperature T (° C.) to the volume $V_c$ (mL) of the reaction raw material liquid heated at the heating temperature T (° C.) is 0.200 to 3.50.

The present invention (4) provides the method for producing particles according to any one of (1) to (3), in which the pressure $P_1$ at the particle generating step is 3.0 times or more the vapor pressure $P_2$ (MPa) of the solvent at the heating temperature T.

The present invention (5) provides the method for producing particles according to any one of (1) to (4), in which at the segmented flow forming step, a ratio ($V_b/V_a$) of a volume $V_b$ (mL) of the gas for segmentation to a volume $V_d$ (mL) of the reaction raw material liquid is 0.200 to 1.50.

The present invention (6) provides the method for producing particles according to any one of (1) to (5), in which at the particle generating step, a diameter of a cross-section of a flow path of the segmented reaction raw material liquid flow is 0.10 to 10.0 mm.

The present invention (7) provides the method for producing particles according to any one of (1) to (6), in which a volumetric flow rate of the reaction raw material liquid at the reaction raw material liquid sending step is 10 μL/minute to 1.0 L/minute.

The present invention (8) provides the method for producing particles according to any one of (1) to (7), in which a particle diameter of the target product particles is 1 to 100 nm.

The present invention (9) provides the method for producing particles according to any one of (1) to (8), in which the reaction raw material liquid includes core particles or intermediate product particles in production of particles having a core/shell structure; and the target product particles are particles having the core/shell structure.

The present invention (10) provides the method for producing particles according to any one of (1) to (9), in which the target product particles are semiconductor fine particles.

The present invention (11) provides the method for producing particles according to (10), in which the semiconductor fine particles include In and P.

The present invention (12) provides the method for producing particles according to any one of (1) to (9), in which the target product particles are metal particles.

The present invention (13) provides the method for producing particles according to (12), in which the metal particles include one or more metals selected from the group consisting of nickel, copper, silver, palladium, platinum, and an alloy made of two or more of these metals.

The present invention (14) provides the method for producing particles according to (13), in which the metal particles include nickel.

The present invention (15) provides the method for producing particles according to any one of (1) to (14), further comprising:
- a cooling step of cooling the product particle flow;
- a gas-liquid separating step of separating the gas for segmentation from the product particle flow; and
- a collecting step of collecting a target product particle dispersion liquid including the target product particles obtained by performing the gas-liquid separating step.

The present invention (16) provides a particle production apparatus comprising:
- a first flow path through which a reaction raw material liquid including at least a raw material for particle formation and a solvent dissolving the raw material for particle formation is sent;
- a segmented flow formation section provided in a downstream side of the first flow path and forming a segmented reaction raw material liquid flow in which the reaction raw material liquid is divided into segments by a gas for segmentation by introducing the gas for segmentation into the reaction raw material liquid;
- a second flow path provided in a downstream side of the segmented flow formation section and forming a product particle flow including target product particles by sending the segmented reaction raw material liquid flow and reacting the raw material for particle formation to generate the target product particles;
a heating section provided on an outer circumference side of the second flow path and heating the segmented reaction raw material liquid flow in the second flow path; and
a pressure control section controlling pressure of the segmented reaction raw material liquid flow in the second flow path, wherein
a volume ratio of the reaction raw material liquid and the gas for segmentation forming the segmented reaction raw material liquid flow, pressure $P_1$ of the segmented reaction raw material liquid flow, and heating temperature T of the segmented reaction raw material liquid flow are controlled by the segmented flow formation section, the heating section, and the pressure control section so that the pressure of the segmented reaction raw material liquid flow flowing through the second flow path is $P_1$ (MPa), the heating temperature of the segmented reaction raw material liquid flow is T (° C.), a ratio ($V_d/V_c$) of a volume $V_d$ (mL) of the gas for segmentation to a volume $V_c$ (mL) of the reaction raw material liquid in the segmented reaction raw material liquid flow is 0.200 to 7.00, and the pressure $P_1$ is 2.0 times or more a vapor pressure $P_2$ (MPa) of the solvent at the heating temperature T.

The present invention (17) provides the particle production apparatus according to (16), in which a quantity of the gas for segmentation introduced into the reaction raw material liquid is 0.100 to 3.00 as a ratio ($V_b/V_a$) of a volume $V_b$ (mL) of the gas for segmentation to a volume $V_a$ (mL) of the reaction raw material liquid.

The present invention (18) provides the particle production apparatus according to (16) or (17), in which the ratio ($V_d/V_c$) of the volume $V_d$ (mL) of the gas for segmentation to the volume $V_c$ (mL) of the reaction raw material liquid is 0.200 to 3.50.

The present invention (19) provides the particle production apparatus according to any one of (16) to (18), in which the pressure $P_1$ is 3.0 times or more the vapor pressure $P_2$ (MPa) of the solvent at the heating temperature T.

The present invention (20) provides the particle production apparatus according to any one of (16) to (19), in which a ratio ($V_b/V_a$) of a volume $V_b$ (mL) of the gas for segmentation to a volume $V_a$ (mL) of the reaction raw material liquid is 0.200 to 1.50.

The present invention (21) provides the particle production apparatus according to any one of (16) to (20), in which
the second flow path is a tube having a circular cross-section,
a diameter of the cross-section of the second path is 0.10 to 10.0 mm, and
a length of the second flow path heated by the heating section is 0.10 to 500 m.

The present invention (22) provides the particle production apparatus according to any one of (16) to (21), in which the pressure control section includes a pressure valve.

The present invention (23) provides the particle production apparatus according to any one of (16) to (22), further comprising: a third flow path provided in a downstream side of the second flow path and allowing the product particle flow to flow;
a cooling section provided on an outer circumference side of the third flow path and cooling the product particle flow flowing through inside of the third flow path;
a gas-liquid separation section provided in a downstream side of the third flow path and separating the gas for segmentation from the product particle flow by gas-liquid separation; and
a collecting section collecting a target product dispersion liquid including the target product particles.

The present invention (24) provides the particle production apparatus according to any one of (16) to (23), in which the particle production apparatus is an apparatus for producing particles having a size of 1 to 100 nm.

The present invention (25) provides the particle production apparatus according to any one of (16) to (24), in which the particle production apparatus is an apparatus for producing semiconductor fine particles.

The present invention (26) provides the particle production apparatus according to (25), in which the particle production apparatus is an apparatus for producing semiconductor fine particles including In and P.

The present invention (27) provides the particle production apparatus according to any one of (16) to (24), in which the particle production apparatus is an apparatus for producing metal particles.

The present invention (28) provides the particle production apparatus according to (27), in which the particle production apparatus is an apparatus for producing metal particles including one or more metals selected from the group consisting of nickel, copper, silver, palladium, platinum, and an alloy made of two or more of these metals.

The present invention (29) provides the particle production apparatus according to (28), in which the particle production apparatus is an apparatus for producing nickel particles.

Advantageous Effects of Invention

According to the present invention, a method for producing particles having particle size distribution that is almost equal to or narrower than that of conventional particles with higher production efficiency with safety maintained and without increasing cost and a production apparatus thereof can be provided.

DESCRIPTION OF EMBODIMENT

Hereinafter, preferable embodiments of the present invention will be described in detail. The present invention, however, is not limited thereto. (An)other step(s) may be included between steps, and an operation not described in each step may be included. In the present specification, the value range represented by using "to" represents the range including the value described before and after "to". For example, "0.10 to 10.0 mm" represents a range of 0.10 mm or more and 10.0 mm or less.

Figure 1:
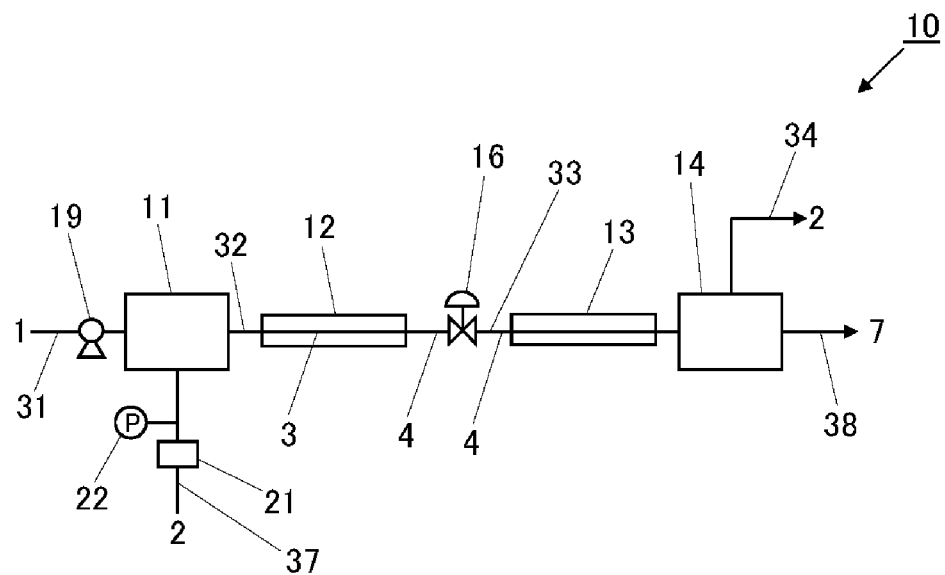
FIG. 1 is a schematic flow diagram of an example of the particle production apparatus according to the present invention.

First, an example of the particle production apparatus according to the present invention will be described with reference to FIG. 1. FIG. 1 is a schematic flow diagram of an example of the particle production apparatus according to the present invention. In FIG. 1, the particle production apparatus 10 includes a segmented flow formation section 11, a pressure control section including a pressure valve 16, a gas-liquid separation section 14, a first flow path tube 31 connected to the segmented flow formation section 11 and for sending a reaction raw material liquid 1 to the segmented flow formation section 11, a gas-for-segmentation introduction tube 37 connected to the segmented flow formation section 11 and introducing a gas for segmentation 2, a second flow path tube 32 connected to the segmented flow formation section 11 at one end, connected to the pressure valve 16 at the other end, and for sending a segmented reaction raw material liquid flow 3 from the segmented flow formation section 11, a third flow path tube 33 connected to the pressure valve 16 at one end, connected to the gas-liquid separation section 14 at the other end, and for sending product particle flow 4, a target product particle dispersion liquid collection tube 38 connected to the gas-liquid separation section 14 at one end, a gas-for-segmentation discharge tube 34 connected to the gas-liquid separation section 14 at one end and for discharging gas for segmentation 2, a heating section 12 provided on the outer circumference side of the second flow path tube 32 and for heating the second flow path tube 32, and a cooling section 13 provided on the outer circumference side of the third flow path tube 33 and for cooling the third flow path tube 33, in which a liquid sending pump 19 for the reaction raw material liquid 1 is attached to the first flow path tube 31, and a mass flow controller 21 and a pressure gauge 22 are attached to the gas-for-segmentation introduction tube 37.

Subsequently, an example of the method for producing particles according to the present invention performed using the particle production apparatus 10 illustrated in FIG. 1 will be described. First, the reaction raw material liquid 1 including at least the raw material for particle formation and the solvent dissolving the raw material for particle formation is prepared. Thereafter, the reaction raw material liquid 1 is sent to the segmented flow formation section 11 through the first flow path tube 31 using the liquid sending pump 19 and, at the same time, the gas for segmentation 2 is fed to the segmented flow formation section 11 while the pressure and flow rate are being adjusted in the gas-for-segmentation introduction tube 37 with the mass flow controller 21, whereby the gas for segmentation 2 is introduced into the reaction raw material liquid 1 in the segmented flow formation section 11 to form the segmented reaction raw material liquid flow 3.

Subsequently, the segmented reaction raw material liquid flow 3 is sent from the segmented flow formation section 11 through the second flow path tube 32 to pass through the heating part of the second flow path tube 32 heated by the heating section 12. When the segmented reaction raw material liquid flow 3 passes through the heating part of the second flow path tube 32, the raw material for particle formation is reacted to generate the target product particles and thus form the product particle flow 4 including the target product particles.

Subsequently, the product particle flow 4 is sent through the third flow path tube 33 and passes through the cooling part of the third flow path tube 33 cooled by the cooling section 13 to cool the product particle flow 4. Thereafter, the product particle flow 4 is fed to the gas-liquid separation section 14.

Subsequently, the gas for segmentation 2 in the product particle flow 4 is separated in the gas-liquid separation section 14, the gas for segmentation 2 is discharged from the gas-for-segmentation discharge tube 34, and the target product particle dispersion liquid 7 is collected from the target product particle dispersion liquid collection tube 38. For example, a gas generated by vaporizing the solvent by heating and a gas generated as a by-product by the reaction may be mixed in the gas for segmentation 2. These gasses are also discharged from the gas-for-segmentation discharge tube 34 together with the gas for segmentation 2.

In the example of the method for producing particles according to the present invention, satisfying the following conditions by adjusting the sending flow rate of the reaction raw material liquid 1, the gas sending pressure and the introduced amount of the gas for segmentation 2, the heating temperature of the segmented reaction raw material liquid flow 3, and the pressure of the segmented reaction raw material liquid flow 3 adjusted by the liquid sending pump 19, the mass flow controller 21, the heating section 12, and the pressure control section having the pressure valve 16, respectively, in the series of the operations is important for performing this method for producing particles. In other words, in the segmented reaction raw material liquid flow 3, the ratio ($V_d/V_c$) of the volume $V_d$ (mL) of the gas for segmentation 2 heated at the heating temperature T (° C.) to the volume $V_c$ (mL) of the reaction raw material liquid 1 heated at the heating temperature T (° C.) is adjusted so as to be in a range of 0.200 to 7.00 and a pressure $P_1$ (MPa) of the segmented reaction raw material liquid flow 3 is adjusted so as to be 2.0 times or more the vapor pressure $P_2$ (MPa) of the solvent at the heating temperature T (° C.) of the segmented reaction raw material liquid flow 3, whereby the particles having particle size distribution that is almost equal to or narrower than that of conventional particles can be produced with higher production efficiency with safety maintained and without increasing cost.

As described above, the example of the method for producing particles according to the present invention is performed to produce the target product particle dispersion liquid 7 using the particle production apparatus 10 illustrated in FIG. 1

The method for producing particles according to the present invention is a method for producing particles, the method including:

a reaction raw material liquid sending step of sending a reaction raw material liquid including at least a raw material for particle formation and a solvent dissolving the raw material for particle formation;

a segmented flow forming step of forming a segmented reaction raw material liquid flow in which the reaction raw material liquid is divided into segments by a gas for segmentation by introducing the gas for segmentation into the reaction raw material liquid; and a particle generating step of forming a product particle flow including target product particles by heating the segmented reaction raw material liquid flow under applying pressure at a pressure $P_1$ (MPa) and at a heating temperature T (° C.) to react the raw material for particle formation to produce the target product particles, in which at the particle generating step, a ratio ($V_d/V_c$) of a volume $V_d$ (mL) of the gas for segmentation heated at the heating temperature T (° C.) to a volume $V_c$ (mL) of the reaction raw material liquid heated at the heating temperature T (° C.) in the segmented reaction raw material liquid flow is 0.200 to 7.00, and the pressure $P_1$ at the particle generating step is 2.0 times or more a vapor pressure $P_2$ (MPa) of the solvent at the heating temperature T.

The target product particles obtained by the method for producing particles according to the present invention are not particularly limited. Examples thereof include semiconductor fine particles, metal particles, metal oxide particles, and organic polymer particles.

The particle diameter of the target product particles obtained by the method for producing particles according to the present invention is not particularly limited and is preferably 1.00 to 100 nm. The method for producing particles according to the present invention exhibits particularly excellent effects for the production of the particles having a particle diameter of 1.00 to 100 nm.

The reaction raw material liquid sending step according to the method for producing particles of the present invention is a step of sending the reaction raw material liquid including at least the raw material for particle formation and the solvent dissolving the raw material for particle formation. The raw material for particle formation, the solvent, and the reaction raw material liquid are different depending on the kind of the target product particles, which is the target product of the production. Hereinafter, the target product particles are exemplified to describe the raw material for particle formation, the solvent, and the reaction raw material liquid. However, these substances are not limited to the substances described below.

<In the Case where the Target Product Particles are Semiconductor Fine Particles>

In the case where the target product particles are semiconductor fine particles, examples of the semiconductor fine particles include particles having a single structure and particles having a core/shell structure made of a core particle and a shell having one or more layers. In the case of the particles having the core/shell structure, elements constituting the shell may be diffused into the core. In the case of the shell having two more layers, elements constituting one of the shells may be diffused into the other shell.

Examples of the semiconductor fine particles made of particles having the single structure include InP-based particles, GaAs-based particles, InAs-based particles. InGaP-based particles, InZnP-based particles, ZnSe-based particles, GaP-based particles, CdSe-based particles, and CdS-based particles.

Examples of the semiconductor fine particles made of the particles having the core/shell structure include particles having an InP/ZnSe—ZnS-based core/shell structure in which the core includes InP and the shell includes ZnSe and ZnS, particles having an InP/GaP—ZnS-based core/shell structure, particles having an InP/ZnSeS—ZnS-based core/shell structure, particles having an InP/ZnS-based core/shell structure, particles having an InP/ZnSe-based core/shell structure, particles having an InGaP/ZnSe—ZnS-based core/shell structure, and particles having a CdSe/CdS-based core/shell structure. The shell may be II-VI Group compounds or III-V Group compounds in addition to the examples described above.

In the case where the target product particles are the semiconductor fine particles made of the particles having the single structure, the raw material for particle formation is a precursor generating the constituting substance of the semiconductor fine particles made of the particles having the single structure by reacting by heating at the particle generating step.

In the case where the target product particles are the core particles of the semiconductor fine particles made of the particles having the core/shell structure, the raw material for particle formation is a precursor generating the constituting substance of the core particles of the semiconductor fine particles by reacting by heating at the particle generating step.

In the case where the target product particles are the semiconductor fine particles made of the particles having the core/shell structure and the shell is formed at the particle generating step, the raw material for particle formation is a precursor generating the constituting substance of the shell of the semiconductor fine particles by reacting by heating at the particle generation step.

In the case where the shell is formed at the particle generating step, the reaction raw material mixed liquid includes mother particles that are a target for forming the shell in addition to the raw material for particle formation and the solvent. For example, in the case where the shell is formed on the surface of the core particle at the particle generating step, the mother particles are the core particles and the reaction raw material liquid includes the core particles in addition to the raw material for particle formation and the solvent. The particle diameter of the core particles is not particularly limited and is preferably 1 to 100 nm. For example, in the case where a second-layer shell is formed on the surface of the particle in which a first-layer shell is formed on the surface of the core particles at the particle generating step, the mother particles are particles made of the core particle and the first-layer shell and the reaction raw material liquid includes the particles made of the core particle and the first-layer shell in addition to the raw material for particle formation and the solvent. As described above, the mother particles are intermediate product particles in the production of the particles having the core/shell structure. In other words, the reaction raw material liquid may include the core particles or the intermediate product particles in the production of the particle having the core/shell structure.

As the precursor of the semiconductor fine particles made of the particles having the single structure, the precursor of the core particles of the semiconductor fine particles made of the particles having the core/shell structure, and the precursor of the shell of the semiconductor fine particles made of the particles having the core/shell structure, known precursors can be used. For example, the raw materials described in Japanese Patent Application No. 2017-253303 may be used.

The solvent is not particularly limited. Examples of the solvent include 1-octadecene, hexadecane, squalane, oleylamine, trioctylphosphine, and trioctylphosphine oxide.

The reaction raw material liquid may include a dispersing agent in addition to the raw material for particle formation and the solvent. The dispersing agent is not particularly limited. For example, a known dispersing agent described in Japanese Patent Application No. 2017-253303 may be used.

<In the Case where the Target Product Particles are Metal Particles>

In the case where the target product particles are metal particles, examples of the metal include nickel, copper, silver, palladium, platinum, and an alloy made of two or more of these metals.

In the case where the target product particles are metal particles, the raw material for particle formation is a precursor forming the metal particles by reacting by heating at the particle generating step. In the case where the target product particles are metal particles, the precursor serving as the raw material for particle formation is not particularly limited. Examples of the precursor include acetate salts, chlorides, fluorides, hydroxides, and nitrate salts of the above metals.

The solvent is not particularly limited. Examples of the solvents include alcohols such as ethylene glycol and triethylene glycol and water.

The reaction raw material liquid may include the dispersing agent and the like in addition to the raw material for particle formation and the solvent.

<In the Case where the Target Product Particles are Metal Oxide Particles>

In the case where the target product particles are metal oxide particles, examples of the metal oxide include samarium oxide, cerium oxide, tungsten oxide, tin oxide, nickel oxide, titanium oxide, niobium oxide, molybdenum oxide, tantalum oxide, iridium oxide, vanadium oxide, tin oxide, aluminum oxide, cesium tungstate, cerium orthovanadate, terbium orthovanadate, antimony-tin oxide, and aluminum-zinc oxide.

In the case where the target product particles are the metal oxide particles, the raw material for particle formation is a precursor forming the metal oxide particles by reacting by heating at the particle generating step. In the case where the target product particles are the metal oxide particles, the precursor serving as the raw material for particle formation is not particularly limited. Examples of the precursor include acetate salts, halides, nitrate salts, carbonate salts, other organic acid salts, and/or any salts that can dissolved in a solvent.

The solvent is not particularly limited. Examples of the solvent include 1-octadecene, hexadecane, squalane, oleylamine, trioctylphosphine, and trioctylphosphine oxide.

The reaction raw material liquid may include the dispersing agent and the like in addition to the raw material for particle formation and the solvent.

<In the Case where the Target Product Particles are Organic Polymer Particles>

In the case where the target product particles are organic polymer particles, examples of the organic polymer particles include polymers formed by polymerizing styrene and the derivatives thereof, vinyl halides, vinyl esters, unsaturated nitriles, (meth)acrylic acid esters, conjugated dienes, and vinyl ketones.

In the case where the target product particles are the organic polymer particles, the raw material for particle formation is a precursor forming the organic polymer particles by reacting to polymerize by heating at the particle generating step. As the precursor, for example, the polymerizable monomer described in Japanese Patent Application Laid-open No. 2006-265477 may be used.

The solvent is not particularly limited. Examples of the solvents include alcohols such as ethylene glycol and triethylene glycol and water.

A polymerization initiator is not particularly limited. For example, the polymerization initiator described in Japanese Patent Application Laid-open No. 2006-265477 may be used.

The reaction raw material liquid may also include additives including surfactants such as amphoteric ion surfactants, anionic surfactants, cationic surfactants, and nonionic surfactants and dispersion stabilizers such as inorganic dispersion stabilizers and polymer dispersion stabilizers in addition to the raw material for particle formation, the solvent, and the polymerization initiator.

The reaction raw material liquid may form an emulsion.

In the method for producing particles according to the present invention, the above raw material for particle formation, solvent, and the like are exemplification. In addition to the substances described above, substances applicable to the method for producing particles according to the present invention are appropriately used depending on the kind of the target product particles.

For example, the vapor pressure of trioctylphosphine at 300° C. is 0.25 MPa and thus desired particles are difficult to obtain under the atmospheric pressure in the case where the reaction system is heated at 300° C. However, use of the method for producing particles according to the present invention allows trioctylphosphine to be preferably used even at 300° C.

For example, the vapor pressure of 1-octadecene at 300° C. is 0.07 MPa and thus the reaction system can be heated to 300° C. even under the atmospheric pressure. 1-Octadecene, however, can be suitably used in order to achieve further higher production efficiency by using the method for producing particles according to the present invention and by controlling the pressure to 2.0 times or more the vapor pressure of 1-octadecene at 300° C.

The reaction raw material liquid at the reaction raw material liquid sending step according to the method for producing particles of the present invention includes at least the raw material for particle formation and the solvent dissolving the raw material for particle formation. Various additives may be included in addition to the raw material for particle formation and the solvent, if necessary.

At the reaction raw material liquid sending step, the reaction raw material liquid obtained by mixing the raw material for particle formation and the solvent is sent to the segmented flow formation section in order to perform the segmented flow forming step. At the reaction raw material liquid sending step, a method for sending the reaction raw material liquid is not particularly limited. Examples of the method include a method in which the reaction raw material liquid is stored in a storage container, the storage container and the segmented flow formation section are connected with a liquid sending tube, and the liquid sending pump is provided in the middle of the tube to send the reaction raw material liquid from the storage container to the segmented flow formation section. Examples of the method also include a method in which the reaction raw material liquid is stored in a storage container, the storage container and the segmented flow formation section are connected with a liquid sending tube, and the reaction raw material liquid is sent by applying pressure to the storage container while the flow rate of the sent liquid is being controlled with the mass flow controller. Examples of the liquid sending pump include a peristaltic pump, a syringe pump, a diaphragm pump, and a gear pump. At the reaction raw material liquid sending step, the volumetric flow rate of the reaction raw material liquid at the time of sending the reaction raw material liquid is not particularly limited. The volumetric flow rate is preferably 10 μL/minute to 1.0 L/minute.

The segmented flow forming step according to the method for producing particles of the present invention is a step of forming the segmented reaction raw material liquid flow in which the reaction raw material liquid is divided into segments by the gas for segmentation by introducing the gas for segmentation into the reaction raw material liquid.

The segmented reaction raw material liquid flow is the flow of the reaction raw material liquid in a state where the reaction raw material liquid is divided into small segments in a flow direction of the reaction raw material liquid by the gas for segmentation in the tube through which the segmented reaction raw material liquid flow is sent. In other words, the segmented reaction raw material liquid flow is made of the segments of the reaction raw material liquid and the gas for segmentation separating the segments of the reaction raw material liquid and is the flow of the reaction raw material liquid in which the segment of the reaction raw material liquid and the gas for segmentation are alternately repeated.

Figure 2:
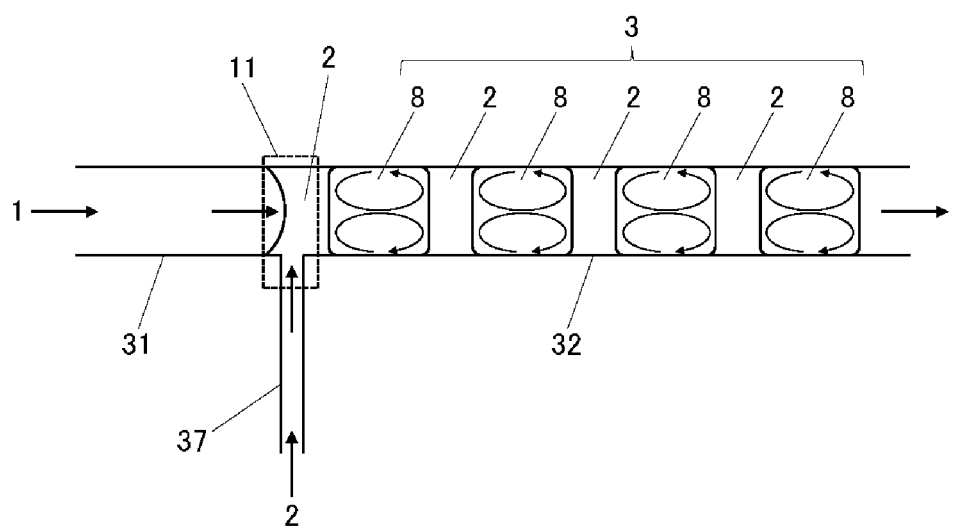
FIG. 2 is a schematic diagram illustrating how the segmented flow is formed.

FIG. 2 illustrates a schematic diagram of the segmented reaction raw material liquid flow. In FIG. 2, the gas for segmentation 2 is fed through the gas-for-segmentation introduction tube 37 to the segmented flow formation section 11 while the reaction raw material liquid 1 is being sent through the first flow path tube 31 to the segmented flow formation section 11 and the gas for segmentation 2 is introduced into the reaction raw material liquid 1 in the segment formation section 11. In the segment formation section 11, the segmented reaction raw material liquid flow 3 in which the reaction raw material liquid 1 is divided into each segment 8, which is a small unit, by the gas for segmentation 2, that is, the segmented reaction raw material liquid flow 3 in which the segment 8 of the reaction raw material liquid and the gas for segmentation 2 are alternately repeated is formed by introducing the gas for segmentation 2 into the reaction raw material liquid 1. In FIG. 2, as illustrated with an arrow, the convection flow of the reaction raw material liquid occurs in each segment 8 of the reaction raw material liquid. Therefore, the temperature difference in the reaction raw material liquid at the time of reacting the raw material for particle formation is small in the reaction raw material liquid and the generation rate difference of the particles is small.

At the segmented flow forming step, a method for forming the segmented reaction raw material liquid flow is not particularly limited. Examples of the method include a method in which the flow of the reaction raw material liquid and the flow of the gas for segmentation are merged using a T-shaped tube to form the segmented reaction raw material liquid flow and a method in which the flow of the reaction raw material liquid and the flow of the gas for segmentation are merged using a Y-shaped tube to form the segmented reaction raw material liquid flow.

At the segmented flow forming step, a method for sending the gas for segmentation is not particularly limited. Examples of the method include a method in which the gas for segmentation is sent from the storage container of the gas for segmentation to the segmented flow formation section while the flow rate of the gas for segmentation is being controlled with the mass flow controller.

At the segmented flow forming step, the ratio $(V_b/V_a)$ of the volume $V_b$ (mL) of the gas for segmentation introduced into the reaction raw material liquid to the volume $V_a$ (mL) of the reaction raw material liquid is not particularly limited. The gas for segmentation having a quantity so as to be a ratio $(V_b/V_a)$ of preferably 0.100 to 3.00, further preferably 0.200 to 1.50, and particularly preferably 0.200 to 0.750 is introduced. The ratio $(V_b/V_a)$ of $V_b$ to $V_a$ within the above range allows the yield of the target product particles per unit time to be high and the particle size distribution to be narrow.

The particle generating step according to the method for producing particles of the present invention is a step of forming the product particle flow including the target product particles by heating the segmented reaction raw material liquid flow under applying pressure at a pressure $P_1$ (MPa) and at a heating temperature T (° C.) to react the raw material for particle formation to produce the target product particles.

In the method for producing particles according to the present invention, the segmented reaction raw material liquid flow is heated to react the raw material for particle formation while the ratio $(V_d/V_c)$ of the volume $V_d$ (mL) of the gas for segmentation heated at the heating temperature T (° C.) to the volume $V_c$ (mL) of the reaction raw material liquid heated at the heating temperature T (° C.) in the segmented reaction raw material liquid flow is being controlled so as to be 0.200 to 7.00, preferably 0.200 to 3.50, and particularly preferably 0.400 to 1.75 at the particle generating step and the pressure $P_1$ is being controlled to 2.0 times or more and preferably 3.0 or more the a vapor pressure $P_2$ (MPa) of the solvent at the heating temperature T at the particle generation step. The ratio $(V_d/V_c)$ of $V_d$ to $V_c$ within the above range and the pressure $P_1$ within the above range allow the flow velocity to be controlled to the desired velocity, even when the segmented reaction raw material liquid flow is heated with applying the pressure, and the state of the segments of the reaction raw material liquid to be uniform. This allows the non-uniformity of the segments to be small and thus the reaction temperature and the reaction rate in the segment and between the segments of the reaction raw material liquid to be uniform. As a result, the particle size distribution of the target product particles can be narrow and the yield per unit time can be high. The upper limit of the pressure $P_1$ is appropriately selected from the viewpoint of, for example, safety and pressure that is controllable by the pressure control section. For example, the upper limit is equal to or less than 100 times the pressure of $P_2$.

At the particle generating step, a method for controlling the pressure $P_1$ is not particularly limited. Examples of the method include a method in which the pressure is controlled to $P_1$ by attaching the pressure control section including the pressure valve at the end part of the tube sending the segmented reaction raw material liquid flow in the opposite side of the segmented flow formation section.

At the particle generating step, a method for controlling the reaction temperature T is not particularly limited. Examples of the method include a method in which the outer circumference side of the tube sending the segmented reaction raw material liquid flow is heated by covering with the heating section such as an oil bath, a sand bath, an oven, or a solder bath, a method for heating using microwaves, and a method for heating using infrared rays. In the method for heating using microwaves, for example, a flow path made of a tube having transmissivity to the microwaves and a solvent having an absorbing property to the microwaves may be used. In the method for heating using infrared rays, for example, a flow path made of a tube having transmissivity to the infrared rays and a solvent having an absorbing property to the infrared rays may be used.

At the particle generating step, the flow velocity of the segmented reaction raw material liquid flow is not particularly limited. The flow velocity is preferably 0.01 to 20 m/minute and particularly preferably 0.10 to 2.0 m/minute. The flow velocity of the segmented reaction raw material liquid flow within the above range allows the yield per unit time to be high and the particle size distribution of the generated particles to be narrow by reducing the non-uniformity of the segments.

At the particle generating step, the cross-section of the flow path of the segmented reaction raw material liquid flow is preferably circular. The diameter of the cross-section of the flow path of the segmented reaction raw material liquid flow is preferably 0.100 to 10.0 mm and particularly preferably 0.500 to 5.00 mm. The diameter of the cross-section of the flow path of the segmented reaction raw material liquid flow within the above range allows the pressure loss to be reduced and the liquid to be sent by a more inexpensive pump, resulting in reduction in the cost. Prevention of floating the gas for segmentation in the flow path to perform appropriate segmentation allows the particle size distribution of the generated particles to be narrow.

In the method for producing particles according to the present invention, the flow velocity can be controlled to the desired velocity and the state of the segments of the reaction raw material liquid can be uniform by controlling the ratio ($V_d/V_c$) of the volume $V_d$ (mL) of the gas for segmentation heated at the heating temperature T (° C.) to the volume $V_c$ (mL) of the reaction raw material liquid heated at the heating temperature T (° C.) in the segmented reaction raw material liquid flow so as to be 0.200 to 7.00, preferably 0.200 to 3.50, and particularly preferably 0.400 to 1.75 at the particle generating step and controlling the pressure $P_1$ to 2.0 times or more and preferably 3.0 or more the vapor pressure $P_2$ (MPa) of the solvent at the heating temperature T at the particle generation step, even when the diameter of the cross-section of the flow path of the segmented reaction raw material liquid flow is increased to preferably 0.100 to 10.0 mm and particularly preferably 0.500 to 5.00 mm and even when the segmented reaction raw material liquid flow is heated with applying pressure. This allows the non-uniformity of the segments to be small and thus the reaction temperature and the reaction rate in the segment and between the segments of the reaction raw material liquid can be uniform. As a result, the particle size distribution of the target product particles can be narrow and the yield per unit time can be high.

At the particle generating step, the flow path length of the flow path of the segmented reaction raw material liquid flow is not particularly limited and is preferably 0.10 to 500 m. At the particle generating step, the time when the segmented reaction raw material liquid flow passes through the heating part of the flow path is not particularly limited and is appropriately selected.

In the method for producing particles according to the present invention, the particle generating step is performed and thereafter cooling of the product particle flow including the target product particles and separation of the target product particles from the product particle flow are performed by appropriate methods to give the target product particles. For example, the target product particles are separated in a state of the target product particle dispersion liquid including the target product particles described below.

The method for producing particles according to the present invention may further include a cooling step of cooling the product particle flow including the target product particles; a gas-liquid separating step of separating the gas for segmentation from the product particle flow; and a collecting step of collecting the target product particle dispersion liquid including the target product particles obtained by performing the gas-liquid separating step. The target product particle dispersion liquid is a dispersion liquid in which the target product particles are dispersed in the solvent.

At the cooling step, a method for cooling the product particle flow is not particularly limited. Examples of the method include a method in which a heat radiation plate is thermally joined on the outer circumference side of the tube through which the product particle flow is sent to cool the liquid, a method in which the tube through which the product particle flow is sent is immersed into a circulating water to cool with water, and a method in which the tube through which the product particle flow is sent is made a double tube and water is flowed in the tube of the outside to cool with water. The medium used for cooling is not limited to water. Any media may be used as long as the media can be used as cooling media. At the cooling step, a cooling temperature is appropriately selected and adjusted so as to be a treatment temperature at the gas-liquid separating step serving as the next step. The cooling step may be in a state where pressure is controlled.

At the gas-liquid separating step, the gas for segmentation is separated from the target product particles and the solvent by gas-liquid separation for the product particle flow made of the target product particles, the solvent, and the gas for segmentation to remove the gas for segmentation. Examples of the method for the gas-liquid separation include a method in which the product particle flow is separated into the target product particle dispersion liquid including the target product particles and the gas for segmentation by flowing the product particle flow into the storage container provided with the outlet of the liquid in the lower part and provided with a check valve in the upper part, the gas is discharged from the check valve so that the pressure inside the container is constant, and the liquid is collected from the outlet of the liquid when the liquid is accumulated in the storage container.

At the collecting step, the target product particle dispersion liquid including the target product particles is collected.

Examples of the target product particles obtained by performing the method for producing particles according to the present invention as described above include the above-described semiconductor fine particles, metal particles, metal oxide particles, and organic polymer particles. However, the target product particles obtained by performing the method for producing particles according to the present invention are not particularly limited to these particles and include target product particles generated from any reaction raw material liquids that the method for producing particles according to the present invention can be applied to.

The particle production apparatus according to the present invention includes a first flow path through which a reaction raw material liquid including at least a raw material for particle formation and a solvent dissolving the raw material for particle formation is sent;

a segmented flow formation section provided in a downstream side of the first flow path and forming a segmented reaction raw material liquid flow in which the reaction raw material liquid is divided into segments by a gas for segmentation by introducing the gas for segmentation into the reaction raw material liquid;

a second flow path provided in a downstream side of the segmented flow formation section and forming a product particle flow including target product particles by sending the segmented reaction raw material liquid flow and reacting the raw material for particle formation to generate the target product particles;

a heating section provided on the outer circumference side of the second flow path and heating the segmented reaction raw material liquid flow in the second flow path; and a pressure control section controlling pressure of the segmented reaction raw material liquid flow in the second flow path, in which a volume ratio of the reaction raw material liquid and the gas for segmentation forming the segmented reaction raw material liquid flow, pressure P of the segmented reaction raw material liquid flow, and heating temperature T of the segmented reaction raw material liquid flow are controlled by the segmented flow formation section, the heating section, and the pressure control section so that the pressure of the segmented reaction raw material liquid flow flowing through the second flow path is $P_1$ (MPa), the heating temperature of the segmented reaction raw material liquid flow is T (° C.), a ratio ($V_d/V_c$) of a volume $V_d$ (mL) of the gas for segmentation to a volume $V_c$ (mL) of the reaction raw material liquid in the segmented reaction raw material liquid flow is 0.200 to 7.00, and the pressure $P_1$ is 2.0 times or more a vapor pressure $P_2$ (MPa) of the solvent at the heating temperature T.

The first flow path according to the particle production apparatus of the present invention is a flow path through which the reaction raw material liquid including at least the raw material for particle formation and the solvent dissolving the raw material for particle formation is sent to the segmented flow formation section. One end side of the first flow path is connected to the segmented formation section. The reaction raw material liquid is fed from the other end side of the first flow path and the other end is, for example, connected to the container for storing the reaction raw material liquid. The cross-sectional shape of the tube forming the first flow path is not particularly limited and is preferably circular. The length of the first flow path is appropriately selected. To the first flow path, a liquid sending section for sending the reaction raw material liquid, for example, the liquid sending pump and the mass flow controller may be attached. The mass flow controller refers to a device for measuring the mass flow rate of gases or liquids with a mass flowmeter and controlling the mass flow rate of the gases or the liquids by opening or closing the valve based on this measured value. Examples of the liquid sending pump include a peristaltic pump, a syringe pump, a diaphragm pump, and a gear pump. Examples thereof include an example in which a plurality of containers for storing the reaction raw material liquid are provided, a flow path is connected to each of the storage containers, a pump is attached to each of the flow paths, and each of the flow paths is merged to the first flow path.

The reaction raw material liquid according to the particle production apparatus of the present invention is the same as the reaction raw material liquid according to the method for producing particles of the present invention.

The segmented flow formation section according to the particle production apparatus of the present invention is provided in the downstream side of the first flow path and is a member, part, or portion for forming the segmented reaction raw material liquid flow in which the reaction raw material liquid is divided into segments by the gas for segmentation by introducing the gas for segmentation into the reaction raw material liquid. To the segmented flow formation section, one end side of the gas-for-segmentation introduction tube is connected. The segmented flow formation section is made of, for example, the flow path of the reaction raw material liquid and the introduction path of the gas for segmentation and connected to the flow path of the reaction raw material liquid in an open state. In further detail, examples of the segmented flow formation section include an aspect in which two flow paths such as a T-shaped tube or a Y-shaped tube are merged to one flow path.

The segmented reaction raw material liquid flow according to the particle production apparatus of the present invention is the same as the segmented reaction raw material liquid flow according to the method for producing particles of the present invention.

The second flow path according to the particle production apparatus of the present invention is a flow path provided in a downstream side of the segmented flow formation section and generating the target product particles and forming the product particle flow including the target product particles by sending the segmented reaction raw material liquid flow and reacting the raw material for particle formation in the flow path. One end side of the second flow path is connected to the segmented flow formation section. The other end side of the second flow path is provided with the pressure control section. The cross-sectional shape of the second flow path is not particularly limited and is preferably circular. The diameter of the cross-section of the tube forming the second flow path is preferably 0.10 to 10.0 mm and particularly preferably 0.50 to 5.00 mm. The diameter of the cross-section of the tube forming the second flow path within the above range allows the particles having a narrow particle size distribution to be obtained in high yield. The length of the second flow path is not particularly limited and is preferably 0.10 to 500 m.

The heating section according to the particle production apparatus of the present invention is provided on the outer circumference side of the second flow path, is a member, part, or portion for heating the segmented reaction raw material liquid flow in the second flow path, and is provided so as to cover the heating portion of the second flow path. Examples of the heating section include an oil bath, a sand bath, an oven, or a solder bath, a microwave heating device, and an infrared ray heating device.

The pressure control section according to the particle production apparatus of the present invention is a member, part, or portion for adjusting the pressure of the segmented reaction raw material liquid flow in the second flow path. The pressure control section is not particularly limited as long as the pressure control section can adjust the pressure of the segmented reaction raw material liquid in the second flow path to a given pressure. Examples of the pressure control section include a pressure control section having a pressure valve and a pressure control section made of a pressure gauge, a valve, and a computer having a calculation unit connected to the pressure gauge and the valve, receiving pressure data sent from the pressure gauge, and sending an instruction for adjusting a degree of opening to the valve based on the data.

In the particle production apparatus according to the present invention, the volume ratio of the reaction raw material liquid and the gas for segmentation forming the segmented reaction raw material liquid flow, the pressure $P_1$ of the segmented reaction raw material liquid flow, and the heating temperature T of the segmented reaction raw material liquid flow are controlled by the segmented flow formation section, the heating section, and the pressure control section so that the pressure of the segmented reaction raw material liquid flow flowing through the second flow path is $P_1$ (MPa), the heating temperature of the segmented reaction raw material liquid flow is T (° C.), a ratio ($V_d/V_c$) of a volume $V_d$ (mL) of the gas for segmentation to a volume $V_c$ (mL) of the reaction raw material liquid in the segmented reaction raw material liquid flow in the segmented reaction raw material liquid flow is 0.200 to 7.00, preferably 0.200 to 3.50, and particularly preferably 0.400 to 1.75, and the pressure $P_1$ is 2.0 times or more and preferably 3.0 times or more the vapor pressure $P_2$ (MPa) of the solvent at the heating temperature T. The particle production apparatus according to the present invention allows the particles having the narrow particle size distribution to be obtained in high yield by setting the ratio ($V_d/V_c$) of $V_d$ to $V_c$ and the pressure $P_1$ within the above ranges.

The particle production apparatus according to the present invention provides the target product particles by separating the gas for segmentation and the solvent by an appropriate method from the product particle flow including the target product particles formed by passing through the second flow path, in detail, the target product particles formed by reacting the raw material for particle formation by passing through the heating part of the second flow path, the gas for segmentation, and the solvent.

In the particle production apparatus according to the present invention, the ratio ($V_b/V_a$) of the volume $V_b$ (mL) of the gas for segmentation introduced into the reaction raw material liquid to the volume $V_a$ (mL) of the reaction raw material liquid is not particularly limited. The fed amount of the reaction raw material liquid and the introduced amount of the gas for segmentation are controlled by the segmented flow formation section so that the ratio ($V_b/V_a$) is preferably 0.100 to 3.00, further preferably 0.200 to 1.50, and particularly preferably 0.200 to 0.750. The ratio ($V_b/V_a$) of $V_b$ to $V_a$ within the above range allows the yield of the target product particles per unit time to be high and the particle size distribution to be narrow.

The particle production apparatus according to the present invention further includes the third flow path provided in the downstream side of the second flow path and allowing the product particle flow to flow, the cooling section provided on the outer circumference side of the third flow path and cooling the product particle flow flowing through the inside of the third flow path, the gas-liquid separation section provided in the downstream side of the third flow path and separating the gas for segmentation from the product particle flow, and the collecting section collecting the target product particle dispersion liquid including the target product particles.

The third flow path is provided in the downstream side of the second flow path and is a flow path through which the product particle flow including the target product particles flows. The cross-sectional shape of the tube forming the third flow path is not particularly limited and is preferably circular. The length of the third flow path is appropriately selected. The third flow path may be subjected to pressure control.

The cooling section is provided on the outer circumference side of the third flow path, is a member, part, or portion for cooling the product particle flow flowing in the third flow path, and is provided so as to cover the cooling portion of the third flow path. Examples of the cooling section include a cooling section in which a heat radiation plate is thermally joined at the outer circumference side of the tube through which the product particle flow is sent to cool the liquid, a cooling section in which the tube through which the product particle flow is sent is immersed into a circulating water to cool with water, and a cooling section in which the tube through which the product particle flow is sent is made a double tube and water is flowed in the outside tube to cool with water.

The gas-liquid separation section is a member, part, or portion for collecting the gas for segmentation by separating the gas for segmentation from the product particle flow including the target product particles.

The collecting section is a member, part, or portion for collecting the target product particle dispersion liquid including the target product particles obtained by separating the gas for segmentation in the gas-liquid separation section.

Examples of the gas-liquid separation section and the collecting section include a gas-liquid separation section in which the product particle flow flows into the storage container provided with the outlet of the liquid in the lower part and provided with a check valve in the upper part, the product particle flow is separated into the target product particle dispersion liquid including the target product particles and the gas for segmentation in the storage container, the gas is discharged from the check valve so that the pressure inside the container is constant, and the liquid is collected from the outlet of the liquid when the liquid is accumulated in a tank.

Examples of the application of the particle production apparatus according to the present invention include an apparatus for producing particles having a size of 1 to 100 nm, an apparatus for producing the semiconductor fine particles, an apparatus for producing the metal particles, an apparatus for producing the metal oxide, and an apparatus for producing the organic polymer particles.

The semiconductor fine particles produced by the apparatus for producing the semiconductor fine particles are not limited. Example thereof include semiconductor fine particles containing In and P.

The metal produced by the apparatus for producing the metal particles is not limited. Examples of the metal include one or more metals selected from the group consisting of nickel, copper, silver, palladium, platinum, and an alloy made of two or more of these metals.

EXAMPLES

Hereinafter, the present invention will be further specifically described with reference to Examples. The present invention, however, is not limited thereto.

Examples 1 to 18 and Comparative Examples 1 to 14

<Preparation of Reaction Raw Material Liquid>

Indium acetate (48 mmol), zinc oleate (101 mmol), oleic acid (130 mmol), 1-dodecanethiol (14.4 mmol), and 1-octadecene (1.6 L) were charged in a precursor tank and while the evacuation was being performed with a vacuum pump the resultant mixture was stirred and heated to 110° C. to react for 20 hours. Thereafter, the reacted mixture was cooled to 25° C. under an atmosphere in which nitrogen gas at 1 atm was introduced from the nitrogen gas source to give an In precursor. Subsequently, to this In precursor, tris (trimethylsilyl)phosphine (32 mmol) serving as a P precursor was added. The resultant mixture was sufficiently stirred to prepare a reaction raw material liquid including the In precursor and the P precursor serving as the raw material for particle formation.

<Production of Target Product Particles>

In a room adjusted at 25° C., a particle production apparatus having a flow illustrated in FIG. 1 in which the length of the tube of the heating section was 100 m and the diameter of the tube was 3 mm was used to produce the target product particles. The vapor pressure $P_2$ of 1-octadecene, which is used as the solvent of the reaction raw material liquid prepared above, at 300° C. is 0.07 MPa.

First, the reaction raw material liquid 1 prepared above was sent at a volumetric flow rate listed in Table 1, a nitrogen gas serving as the gas for segmentation 2 was introduced at a volumetric flow rate so as to be a volumetric ratio ($V_b/V_a$) listed in Table 1, and the flows of the reaction raw material liquid 1 and gas for segmentation 2 were merged into one flow path using a T-shaped tube serving as the segmented flow formation section 11 to give the segmented reaction raw material liquid flow.

Subsequently, the pressure $P_1$ of the segmented reaction raw material liquid flow 3 in the second flow path 32 was adjusted to a pressure listed in Table 1 and the temperature was adjusted to 300° C. The segmented reaction raw material liquid flow 3 passed through the heating part of the second flow path 32 to produce the target product particles. The ratios ($V_d/V_c$) of the volume $V_d$ (mL) of the heated gas for segmentation to the volume $V_c$ (mL) of the heated reaction raw material liquid $V_c$ (mL) are listed in Table 1. In Comparative Example 1, the volumetric flow rate of the segmented reaction raw material liquid flow 3 at the time of heating was 258.9 mL/minute and the residential time of the segmented reaction raw material liquid flow 3 from entering into to exiting from the heating section 12 was about 3 minutes. In Examples 1 to 18 and Comparative Examples 2 to 14, the volumetric flow rate of the segmented reaction raw material liquid flow 3 at the time of heating was 70.6 mL/minute and the residential time of the segmented reaction raw material liquid flow 3 from entering into to exiting from the heating section 12 was about 10 minutes.

Subsequently, gas-liquid separation of the obtained product particle flow 4 was performed to separate the gas for segmentation 2 and thus the target product particle dispersion liquid 7 including the InP particles serving as the target product particles was obtained. At this time, the yield of the InP particles in each Example and Comparative Example per unit time was calculated by determining the yield of the InP particles in Comparative Example 2 per unit time to be 1.00. The results are listed in Table 1.

Subsequently, treatment in which a shell was attached to the obtained InP core was performed. To a reaction container provided with a stirrer and a heater for heating, fed with an inert gas, and having a closed structure that oxygen in air and moisture did not enter, 1 L of the InP particle dispersion liquid obtained above was charged. To the InP particle dispersion liquid, octanoyl chloride (52.5 mmol) was added. The temperature was raised to 240° C. and the mixture was heated for 3 hours. Subsequently, the temperature was lowered to 200° C. and a 1-octadecene (75 mL) solution of zinc oleate (30 mmol) and a solution in which Se (30 mmol) was dissolved in TBP (45 mmol) were added and the resultant mixture was heated at 200° C. for 30 minutes. Dodecanethiol (120 mmol) and a 1-octadecene solution (150 mL) of zinc oleate (60 mmol) were further added. The temperature was raised to 250° C. and the mixture was heated for 3 hours. Thereafter, the temperature was lowered to 25° C. to give a solution including the semiconductor fine particles having the core/shell structure of InP/ZnSe—ZnS.
<Measurement of Full Width at Half Maximum (FWHM) and Quantum Yield (QY)>

The optical properties of the semiconductor nanoparticles were measured using a quantum yield measurement system (QE-2100, manufactured by Otsuka Electronics Co., Ltd.). The solution including the semiconductor fine particles having the core/shell structure was dispersed in a dispersion liquid and the obtained dispersion liquid was irradiated with excitation light to give an emission spectrum. The fluorescence quantum yield (QY) and the full width at half maximum (FWHM) were calculated from the emission spectrum after re-excitation correction in which a re-excitation fluorescence emission spectrum generated by fluorescence emission caused by re-excitation was eliminated from the emission spectrum obtained here. As the dispersion liquid, normal-hexane or 1-octadecene was used.

With respect to the semiconductor fine particles, as the particle diameter becomes larger, the emission wavelength tends to become longer, whereas as the particle diameter becomes smaller, the emission wavelength tends to become shorter. Therefore, it is indicated that as the full width at half maximum of the semiconductor fine particles having the core/shell structure becomes smaller, the particle size distribution of the InP particles serving as the core particles becomes narrower. In addition, it is indicated that as the quantum yield of the semiconductor fine particles became higher, the semiconductor fine particles having more excellent performance were obtained. Therefore, this indicates that the production of the core particles was excellent.

Example 19

<Preparation of Reaction Raw Material Liquid>

Indium isopropoxide (60 mmol), anhydrous indium chloride (60 mmol), and trioctylphosphine (2,000 g) were charged into a precursor tank. The resultant mixture was dissolved with stirring while the pressure was being reduced with a vacuum pump to 100 Pa or less to give an In precursor. To this solution, tris(trimethylsilyl)phosphine (90 mmol) was added as a P precursor. The resultant mixture was sufficiently stirred to prepare the reaction raw material liquid.
<Production of Target Product Particles>

The target product particle dispersion liquid was obtained by the same manner as the manner in Examples and Comparative Examples described above except that the reaction raw material liquid prepared above was used, that the pressure $P_1$ of the segmented reaction raw material liquid flow 3 was adjusted to 0.7 MPa, and that the heating temperature T was adjusted to 300° C. The pressurization conditions were set on the bases of a vapor pressure of trioctylphosphine at 300° C. of 0.25 MPa.

Example 20

<Preparation of Reaction Raw Material Liquid>

Anhydrous indium chloride (18 mmol), anhydrous zinc chloride (18 mmol), and oleylamine (1,000 ml) were charged into a precursor tank. The resultant mixture was dissolved with stirring while the mixture was being heated at 100° C. to give an In precursor. After this solution was cooled to room temperature, tris(dimethylamino) phosphine (5 mL) was added as the P precursor. The resultant mixture was sufficiently stirred to prepare the reaction raw material liquid.
<Production of Target Product Particles>

The target product particle dispersion liquid was obtained by the same manner as the manner in Examples and Comparative Examples described above except that the reaction raw material liquid prepared above was used, that the pressure $P_1$ of the segmented reaction raw material liquid flow 3 was adjusted to 0.4 MPa, and that the heating temperature T was adjusted to 300° C. The pressurization conditions were set on the bases of a vapor pressure of oleylamine at 300° C. of 0.058 MPa.

TABLE 1

| | | Volumetric flow rate of reaction raw material liquid (mL/minute) | Gas/Reaction raw material liquid ($V_b/V_a$) volume ratio) | Pressure $P_1$ (MPa) | $P_1/P_2$ | Gas/Reaction raw material liquid ($V_d/V_c$) volume ratio) | Yield per unit time (Relative value) | Full width at half maximum (nm) | QY (%) |
|---|---|---|---|---|---|---|---|---|---|
| Comparative Example | 1 | 34.46 | 1.00 | 0.10 | 1.43 | 5.83 | 0.00 | — | — |
| Comparative Example | 2 | 9.40 | 1.00 | 0.10 | 1.43 | 5.83 | 1.00 | 38.11 | 76.2 |
| Example | 1 | 15.00 | 1.00 | 0.15 | 2.14 | 3.28 | 1.60 | 37.04 | 76.0 |
| Example | 2 | 17.39 | 1.00 | 0.20 | 2.86 | 2.69 | 1.85 | 37.12 | 78.0 |
| Example | 3 | 19.57 | 1.00 | 0.30 | 4.29 | 2.28 | 2.08 | 37.09 | 75.9 |
| Comparative Example | 3 | 56.80 | 0.0625 | 0.40 | 5.71 | 0.130 | 6.03 | 39.07 | 76.0 |
| Example | 4 | 50.94 | 0.125 | 0.40 | 5.71 | 0.260 | 5.40 | 38.10 | 76.2 |
| Example | 5 | 41.95 | 0.250 | 0.40 | 5.71 | 0.530 | 4.46 | 37.12 | 76.5 |
| Example | 6 | 31.16 | 0.500 | 0.40 | 5.71 | 1.06 | 3.31 | 37.02 | 75.5 |
| Example | 7 | 20.57 | 1.00 | 0.40 | 5.71 | 2.12 | 2.19 | 37.11 | 76.1 |
| Example | 8 | 12.25 | 2.00 | 0.40 | 5.71 | 4.24 | 1.30 | 36.99 | 77.2 |
| Comparative Example | 4 | 6.77 | 4.00 | 0.40 | 5.71 | 8.48 | 0.72 | 37.09 | 75.4 |
| Comparative Example | 5 | 3.58 | 8.00 | 0.40 | 5.71 | 16.95 | 0.38 | 38.51 | 76.3 |
| Comparative Example | 6 | 1.84 | 16.0 | 0.40 | 5.71 | 33.90 | 0.20 | 38.98 | 75.6 |
| Comparative Example | 7 | 57.31 | 0.0625 | 0.70 | 10.00 | 0.120 | 6.09 | 39.02 | 74.9 |
| Example | 9 | 51.76 | 0.125 | 0.70 | 10.00 | 0.240 | 5.49 | 38.03 | 74.1 |
| Example | 10 | 43.08 | 0.250 | 0.70 | 10.00 | 0.490 | 4.60 | 37.05 | 73.5 |
| Example | 11 | 32.58 | 0.500 | 0.70 | 10.00 | 0.970 | 3.46 | 37.00 | 75.8 |
| Example | 12 | 21.83 | 1.00 | 0.70 | 10.00 | 1.94 | 2.32 | 37.20 | 77.3 |
| Example | 13 | 13.15 | 2.00 | 0.70 | 10.00 | 3.88 | 1.40 | 37.01 | 74.3 |
| Comparative Example | 8 | 7.32 | 4.00 | 0.70 | 10.00 | 7.77 | 0.78 | 37.13 | 76.2 |
| Comparative Example | 9 | 3.88 | 8.00 | 0.70 | 10.00 | 15.54 | 0.41 | 38.49 | 75,9 |
| Comparative Example | 10 | 2.00 | 16.0 | 0.70 | 10.00 | 31.08 | 0.21 | 39.02 | 76.2 |
| Comparative Example | 11 | 57.31 | 0.0625 | 1.00 | 14.29 | 0.120 | 6.11 | 39.17 | 74.7 |
| Example | 14 | 52.18 | 0.125 | 1.00 | 14.29 | 0.230 | 5.53 | 38.09 | 74.2 |
| Example | 15 | 43.66 | 0.250 | 1.00 | 14.29 | 0.470 | 4.64 | 37.22 | 75.0 |
| Example | 16 | 33.08 | 0.500 | 1.00 | 14.29 | 0.940 | 3.52 | 37.10 | 75.4 |
| Example | 17 | 22.29 | 1.00 | 1.00 | 14.29 | 1.88 | 2.37 | 37.12 | 76.8 |
| Example | 18 | 13.48 | 2.00 | 1.00 | 14.29 | 3.76 | 1.43 | 36.98 | 76.9 |
| Comparative Example | 12 | 7.53 | 4.00 | 1.00 | 14.29 | 7.52 | 0.80 | 37.11 | 74.2 |
| Comparative Example | 13 | 4.00 | 8.00 | 1.00 | 14.29 | 15.04 | 0.43 | 38.42 | 75.4 |
| Comparative Example | 14 | 2.07 | 16.0 | 1.00 | 14.29 | 30.07 | 0.22 | 38.99 | 75.1 |

As can be seen from the above results, in Examples 1 to 18, in which both of the pressure $P_1$ (MPa) and ($V_d/V_c$) were within the ranges specified in the present invention, the obtained semiconductor fine particles had small full widths at half maximum and high yields per unit time, that is, a narrow particle size distribution and high production efficiency.

On the other hand, in Comparative Example 1, in which the pressure $P_1$ (MPa) was excessively low, the flow velocity was fast and thus the heating time was insufficient. Consequently, the particles were not sufficiently grown and thus the particles having the desired particle diameter could not be obtained. In Comparative Example 2, the slow flow velocity for heating for the predetermined time resulted in a low yield. In Comparative Examples 3, 7, and 11, in which ($V_d/V_c$) was excessively small, the full widths at half maximum became wide. In Comparative Examples 4 to 6, 8 to 10, and 12 to 14, in which the ratios ($V_d/V_c$) were excessively large, the yields were lower than that in Comparative Example 2.

REFERENCE SIGNS LIST

1 Reaction Raw Material Liquid
2 Gas for Segmentation
3 Segmented Reaction Raw Material Liquid Flow
4 Product Particle Flow
7 Target Product Particle Dispersion Liquid
8 Segment of Reaction Raw Material Liquid
10 Particle Production Apparatus
11 Segmented Flow Formation Section
12 Heating Section
13 Cooling Section
14 Gas-Liquid Separation Section
16 Pressure Valve
19 Liquid Sending Pump
21 Mass Flow Controller
22 Pressure gauge
31 First Flow Path Tube
32 Second Flow Path Tube
33 Third Flow Path Tube 34 Gas-for-Segmentation Discharge Tube
37 Gas-for-Segmentation Introduction Tube
38 Target Product Particle Dispersion Liquid Collection Tube

The invention claimed is:

1. A method for producing particles, the method comprising:
   a reaction raw material liquid sending step of sending a reaction raw material liquid through a first flow path, the reaction raw material liquid including at least a raw material for particle formation and a solvent dissolving the raw material for particle formation;
   a segmented flow forming step of forming a segmented reaction raw material liquid flow in which the reaction raw material liquid is divided into segments by a gas for segmentation by introducing the gas for segmentation into the reaction raw material liquid in a downstream side of the first flow path; and
   a particle generating step of forming a product particle flow including target product particles by heating the segmented reaction raw material liquid flow under applying pressure at a pressure $P_1$ (MPa) and at a heating temperature T (° C.) to react the raw material for particle formation to produce the target product particles, wherein
   at the particle generating step, a ratio ($V_d/V_c$) of a volume $V_d$ (mL) of the gas for segmentation heated at the heating temperature T (° C.) to a volume $V_c$ (mL) of the reaction raw material liquid heated at the heating temperature T (° C.) in the segmented reaction raw material liquid flow is 0.200 to 7.00, and
   the pressure $P_1$ at the particle generating step is 2.0 times or more a vapor pressure $P_2$ (MPa) of the solvent at the heating temperature T.

2. The method for producing particles according to claim 1, wherein at the segmented flow forming step, the gas for segmentation is introduced into the reaction raw material liquid in a quantity in which a ratio ($V_b/V_a$) of a volume $V_b$ (mL) of the gas for segmentation to a volume $V_a$ (mL) of the reaction raw material liquid is 0.100 to 3.00.

3. The method for producing particles according to claim 1, wherein at the particle generating step, the ratio ($V_d/V_c$) of the volume $V_d$ (mL) of the gas for segmentation heated at the heating temperature T (° C.) to the volume $V_c$ (mL) of the reaction raw material liquid heated at the heating temperature T (° C.) is 0.200 to 3.50.

4. The method for producing particles according to claim 1, wherein the pressure $P_1$ at the particle generating step is 3.0 times or more the vapor pressure $P_2$ (MPa) of the solvent at the heating temperature T.

5. The method for producing particles according to claim 1, wherein at the segmented flow forming step, a ratio ($V_b/V_a$) of a volume $V_b$ (mL) of the gas for segmentation to a volume $V_a$ (mL) of the reaction raw material liquid is 0.200 to 1.50.

6. The method for producing particles according to claim 1, wherein at the particle generating step, a diameter of a cross-section of a flow path of the segmented reaction raw material liquid flow is 0.10 to 10.0 mm.

7. The method for producing particles according to claim 1, wherein a volumetric flow rate of the reaction raw material liquid at the reaction raw material liquid sending step is 10 μL/minute to 1.0 L/minute.

8. The method for producing particles according to claim 1, wherein a particle diameter of the target product particles is 1 to 100 nm.

9. The method for producing particles according to claim 1, wherein
   the reaction raw material liquid includes core particles or intermediate product particles in production of particles having a core/shell structure, and
   the target product particles are particles having the core/shell structure.

10. The method for producing particles according to claim 1, wherein the target product particles are semiconductor fine particles.

11. The method for producing particles according to claim 10, wherein the semiconductor fine particles include In and P.

12. The method for producing particles according to claim 1, wherein the target product particles are metal particles.

13. The method for producing particles according to claim 12, wherein the metal particles include one or more metals selected from the group consisting of nickel, copper, silver, palladium, platinum, and an alloy made of two or more of these metals.

14. The method for producing particles according to claim 13, wherein the metal particles include nickel.

15. The method for producing particles according to claim 1, further comprising:
   a cooling step of cooling the product particle flow;
   a gas-liquid separating step of separating the gas for segmentation from the product particle flow; and
   a collecting step of collecting a target product particle dispersion liquid including the target product particles obtained by performing the gas-liquid separating step.

16. A particle production apparatus comprising:
   a first flow path through which a reaction raw material liquid including at least a raw material for particle formation and a solvent dissolving the raw material for particle formation is sent;
   a segmented flow formation section provided in a downstream side of the first flow path and forming a segmented reaction raw material liquid flow in which the reaction raw material liquid is divided into segments by a gas for segmentation by introducing the gas for segmentation into the reaction raw material liquid;
   a second flow path provided in a downstream side of the segmented flow formation section and forming a product particle flow including target product particles by sending the segmented reaction raw material liquid flow and reacting the raw material for particle formation to generate the target product particles;
   a heating section provided on an outer circumference side of the second flow path and heating the segmented reaction raw material liquid flow in the second flow path; and
   a pressure control section controlling pressure of the segmented reaction raw material liquid flow in the second flow path, wherein
   a volume ratio of the reaction raw material liquid and the gas for segmentation forming the segmented reaction raw material liquid flow, pressure $P_1$ of the segmented reaction raw material liquid flow, and heating temperature T of the segmented reaction raw material liquid flow are controlled by the segmented flow formation section, the heating section, and the pressure control section so that the pressure of the segmented reaction raw material liquid flow flowing through the second flow path is $P_1$ (MPa), the heating temperature of the segmented reaction raw material liquid flow is T (° C.), a ratio ($V_d/V_c$) of a volume $V_d$ (mL) of the gas for segmentation to a volume $V_c$ (mL) of the reaction raw material liquid in the segmented reaction raw material liquid flow is 0.200 to 7.00, and the pressure $P_1$ is 2.0 times or more a vapor pressure $P_2$ (MPa) of the solvent at the heating temperature T.

17. The particle production apparatus according to claim 16, wherein a quantity of the gas for segmentation introduced into the reaction raw material liquid is 0.100 to 3.00 as a ratio ($V_b/V_a$) of a volume $V_b$ (mL) of the gas for segmentation to a volume $V_a$ (mL) of the reaction raw material liquid.

18. The particle production apparatus according to claim 16, wherein the ratio ($V_d/V_c$) of the volume $V_d$ (mL) of the gas for segmentation to the volume $V_c$ (mL) of the reaction raw material liquid is 0.200 to 3.50.

19. The particle production apparatus according to claim 16, wherein the pressure $P_1$ is 3.0 times or more the vapor pressure $P_2$ (MPa) of the solvent at the heating temperature T.

20. The particle production apparatus according to claim 16, wherein a ratio ($V_b/V_a$) of a volume $V_b$ (mL) of the gas for segmentation to a volume $V_a$ (mL) of the reaction raw material liquid is 0.200 to 1.50.

21. The particle production apparatus according to claim 16, wherein
 the second flow path is a tube having a circular cross-section,
 a diameter of the cross-section of the second path is 0.10 to 10.0 mm, and
 a length of the second flow path heated by the heating section is 0.10 to 500 m.

22. The particle production apparatus according to claim 16, wherein the pressure control section includes a pressure valve.

23. The particle production apparatus according to claim 16, further comprising:
 a third flow path provided in a downstream side of the second flow path and allowing the product particle flow to flow;
 a cooling section provided on an outer circumference side of the third flow path and cooling the product particle flow flowing through inside of the third flow path;
 a gas-liquid separation section provided in a downstream side of the third flow path and separating the gas for segmentation from the product particle flow by gas-liquid separation; and
 a collecting section collecting a target product dispersion liquid including the target product particles.

24. The particle production apparatus according to claim 16, wherein the particle production apparatus is an apparatus for producing particles having a size of 1 to 100 nm.

25. The particle production apparatus according to claim 16, wherein the particle production apparatus is an apparatus for producing semiconductor fine particles.

26. The particle production apparatus according to claim 25, wherein the particle production apparatus is an apparatus for producing semiconductor fine particles including In and P.

27. The particle production apparatus according to claim 16, wherein the particle production apparatus is an apparatus for producing metal particles.

28. The particle production apparatus according to claim 27, wherein the particle production apparatus is an apparatus for producing metal particles including one or more metals selected from the group consisting of nickel, copper, silver, palladium, platinum, and an alloy made of two or more of these metals.

29. The particle production apparatus according to claim 28, wherein the particle production apparatus is an apparatus for producing nickel particles.

* * * * *